No. 887,117.
PATENTED MAY 12, 1908.
W. PARFREY.
SHOCK ABSORBER.
APPLICATION FILED DEC. 28, 1906.
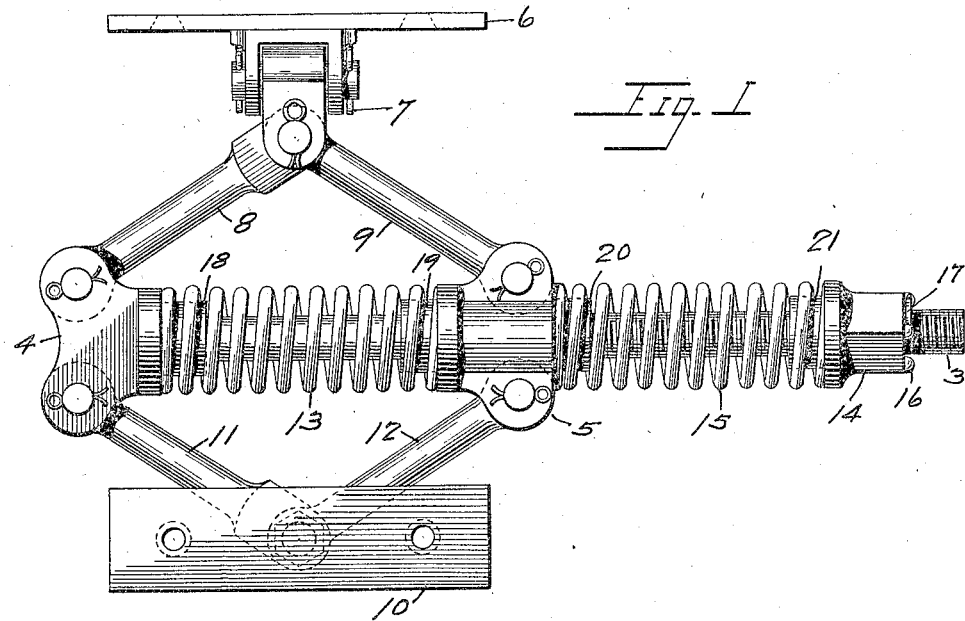
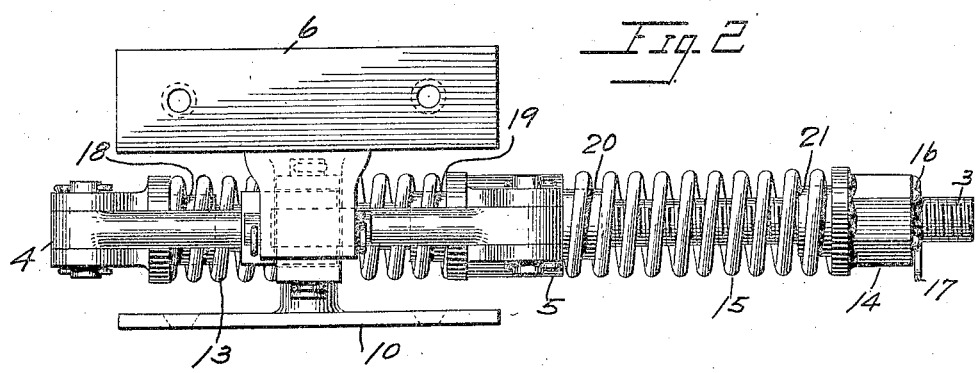
Witnesses
C. H. Bertholf
Geo. H. Crossett
Inventor
William Parfrey
By his Attorney
Garry P. Van Wye

UNITED STATES PATENT OFFICE.

WILLIAM PARFREY, OF NEW YORK, N. Y.

SHOCK-ABSORBER.

No. 887,117.　　　　Specification of Letters Patent.　　　　Patented May 12, 1908.

Application filed December 28, 1906. Serial No. 349,781.

*To all whom it may concern:*

Be it known that I, WILLIAM PARFREY, a subject of the King of Great Britain, residing at New York, in the county and State of New York, have invented a new and useful Shock-Absorber, of which the following is a specification.

This invention relates to devices for relieving the shock on vehicle springs, and especially in connection with automobiles where the vehicle bodies and machinery are very heavy; and has for its object to provide a device of this kind which will effectually relieve any sudden shock on the vehicle springs whether the tendency is either to throw the body of the vehicle up or down.

The invention is illustrated in the accompanying drawing in which—

Figure 1 is a side elevation of a shock absorber constructed according to my invention; and Fig. 2, is a plan view thereof.

In the accompanying drawing like numerals of reference refer to the same parts in each of the views; and in practice I provide a shock absorber comprising a shaft 3, on one end of which is secured a head 4, and intermediate of the ends thereof is mounted a sliding sleeve 5. Above the shaft 3, I mount a plate 6, connected by a double joint 7, and two links 8, and 9, with the head 4 and sleeve 5 respectively, so that the plate 6 is free to swing, or turn in two directions, but can only move vertically by sliding the sleeve 5 in either direction on the shaft 3, as will be understood.

Below the shaft 3 I mount a plate 10, which is connected with the head 4, and sleeve 5, by two links 11, and 12, respectively, the connection at the ends being pivotal so that the sleeve 5 will be free to slide along the shaft 3 under certain conditions, or when a sudden shock will have a tendency to throw the body of the vehicle up or down, or to tilt the axle.

Mounted between the sleeve 5 and the head 4, is a spring 13, and on the outer end of the shaft 3 is a nut 14, between which and the sleeve 5 is mounted a spring 15, so that when the sleeve 5 moves toward the head 4, it will move against the action of the spring 13, and when it moves toward the nut 14, it will move against the action of the spring 15. The shaft 3 is threaded at the end so that the nut 14 may be screwed in either direction on the shaft thereby increasing or decreasing the tension of both springs at the same time, as will be readily understood. It will thus be seen that I have provided a toggle joint with one end fixed on the shaft 3, and the other end free to slide along the shaft. It is evident, though, that both ends might be made sliding on the shaft 3.

In order that the nut 14 may be held fixed in the desired position when secured in place, I prefer to provide the end of the nut 14 with projecting lugs 16, and I may use a cotter pin 17 through the shaft 3, it being understood that any number of holes may be made in the shaft to allow for the different positions of the nut 14. When the pin 17 is in place, it is between two sets of lugs so that the nut can not turn in either direction until the pin is removed.

In order to hold the springs 13 and 15 free from the shaft, and insure the direct action on the same without friction on the shaft, I have provided the head 4 with a hub 18, the sleeve 5 with hubs 19, and 20, and the nut 14, with a hub 21, all of which are of a size to allow the springs to slip over the same and to be held thereon with slight friction.

The operation is as follows: The plate 6 may be secured to the frame of the body of the vehicle, and the plate 10 is secured to the axle, or to the spring resting on the axle so that the shock absorber will act with the spring of the vehicle to relieve any sudden shock from exerting its full force on the same. Should the tendency of the shock be to throw the vehicle body upward, the force would draw the sleeve 5 toward the head 4 against the action of the spring 13, but should the tendency be to throw the body of the vehicle downward, the sleeve 5 would be pressed toward the nut 14, against the action of the spring 15, so that this construction provides against sudden shock in either direction; and as these springs may be made quite heavy, very effective means are provided to prevent any sudden shock from exerting its full power upon the spring of the vehicle. The plate 6 being connected with the links 8 and 9 by a double joint, the body of the vehicle will be free to either swing, or tilt, as will be readily understood.

While I have described the double joint connection 7, as being at the top of the shock absorber, or at the connection with the vehicle body, in many cases it might be desirable to make this double joint at the connection with the axle, so that I do not confine myself to having the connection at the top, or to having just one connection double jointed, as it may be desirable to make both connections double jointed.

While I have described this shock absorber as being especially applicable to automobiles, I do not confine myself to that use, or to the use of the absorber in connection with springs, as it might be used in place of a spring.

Having thus described my invention, what I claim as new and desire to secure by Letters Patent of the United States is—

1. A shock absorber comprising a shaft, a toggle joint connected therewith, and springs on said shaft adapted to limit the movement of said joint in either direction vertically.

2. A shock absorber comprising a shaft, a toggle joint connected therewith, and two springs on said shaft, one of said springs being within the joint, and the other spring being outside the joint, as and for the purpose set forth.

3. A shock absorber comprising a shaft, a stationary member connected therewith, a movable member thereon, said members being pivotally connected with the body of the vehicle and with the axle, a spring on said shaft on each side of said movable member, and means to regulate the tension of said springs.

4. A shock absorber comprising a shaft, a stationary member secured to one end thereof, a sliding sleeve mounted thereon intermediate of the ends, a spring between said stationary member, and said movable member, a nut on the end of said shaft, and a spring between said nut and said movable member, and means to pivotally connect said members with the body of a vehicle and with the axle thereof.

5. A shock absorber comprising a shaft, a head on one end thereof, a sleeve intermediate of the ends, a nut on the end opposite said head, a spring mounted between said head and said sleeve, and a second spring mounted between said sleeve and said nut, hubs on said head, sleeve, and nut to center said springs, means to hold said nut in a fixed position, said head and sleeve being pivotally connected with the body of the vehicle, and with the axle thereof, for the purpose set forth.

6. The herein described shock absorber comprising a shaft a head fixed on one end thereof, a sliding sleeve intermediate of the ends, a nut on the end opposite said head, a spring between said head and said sleeve, a spring between said sleeve and said nut, a plate adapted to be connected with the body of a vehicle, a double joint connected therewith, links connecting said double joint with the head and sleeve respectively, a plate adapted to be connected with the axle, and links connecting said second plate with said head and said sleeve, substantially as and for the purpose described.

In testimony whereof I have signed my name to this specification in the presence of two subscribing witnesses.

WILLIAM PARFREY.

Witnesses:
 GEO. H. CROSSETT,
 G. P. VAN WYE.